United States Patent [19]
Sato et al.

[11] Patent Number: 5,457,803
[45] Date of Patent: Oct. 10, 1995

[54] BIT-FIELD LOGIC OPERATION UNIT

[75] Inventors: Yoshiyasu Sato, Yokohama; Taizo Sato, Kawasaki, both of Japan

[73] Assignee: Fujitsu Limited, Kawasaki, Japan

[21] Appl. No.: 202,876

[22] Filed: Feb. 28, 1994

Related U.S. Application Data

[63] Continuation of Ser. No. 551,231, Jul. 11, 1990, abandoned.

[30] Foreign Application Priority Data

Jul. 13, 1989 [JP] Japan ..................................... 1-178930

[51] Int. Cl.⁶ ..................................................... G06F 7/00
[52] U.S. Cl. .................. 395/775; 364/259.7; 364/259.8; 364/DIG. 1
[58] Field of Search ..................................... 395/800, 550, 395/775

[56] References Cited

U.S. PATENT DOCUMENTS

| | | | |
|---|---|---|---|
| 4,400,794 | 8/1983 | Koos | 364/900 |
| 4,945,472 | 7/1990 | Sakamura | 364/200 |

FOREIGN PATENT DOCUMENTS

0171190A2  2/1986  European Pat. Off. .

OTHER PUBLICATIONS

*Digital Processes,* vol. 4, No. 2, 1978, St.–Saphorin CH, pp. 67–81; D. Gajski et al: "High–Speed Masking Rotator", p. 69, line 8—15; Figure 2, Table 1.

*Primary Examiner*—David Y. Eng
*Attorney, Agent, or Firm*—Armstrong, Westerman, Hattori, McLeland & Naughton

[57] ABSTRACT

A bit field logic operation unit which performs a logic operation accompanied by a masking operation comprises a logic operation part, a mask pattern generation part, and a bit map operation part. All parts are constituted by dynamic circuit constructions where the processes are performed in a preset period and an active period. The preset periods of the logic operation part and the mask pattern generation part are carried out simultaneously, and the active periods of the logic operation part and the mask pattern generation part and the preset period of the bit map operation part are carried out simultaneously.

10 Claims, 6 Drawing Sheets

BIT-FIELD LOGIC OPERATION UNIT

This application is a continuation of application Ser. No. 07/551,231 filed Jul. 11, 1990, now abandoned.

BACKGROUND OF THE INVENTION

1. Field of the Invention

This invention relates to a logic operation unit (LU) adapted for use in a computer system, more particularly, a bit field logic operation unit which performs a logic operation accompanied by a masking operation of a part of an operand.

2. Description of the Related Art

In a computer system, a logic operation such as AND, OR, EOR and the like accompanied by a masking operation is sometimes required. A bit or bits to be masked are specified by mask information, A bit or bits of an operand in the specified bit position are not altered by the logic operation, and only a remaining bit or bits are altered by the logic operation.

This kind of operation can be performed by carrying out the following three processes:

1) logic operation of two operands,
2) calculation of a bit mask pattern from the mask information, and
3) selection of each bit from either a result of the logic operation or one of two operands according to the bit mask pattern.

Conventionally, the logic operation accompanied by the mark operation is realized by controlling an ALU (Arithmetic Logic Unit) provided in the computer system according to a microprogram which is constituted from three microinstructions which correspond to these three processes 1) to 3), respectively.

In the aforementioned manner, however, the logic operation cannot be performed within one machine cycle, because the processes 1) to 3) must be sequentially executed. Therefore, considerable execution time has been required to execute an instruction for manipulating a specified bit or bits. Particularly, in the case where a variable-length bit field is manipulated, many microprogram steps have been required so that a plurality of machine cycles have been occupied.

Another matter to be considered in the design of a logic operation unit is that the number of elements constituting the logic unit and power consumption thereof should be as small as possible.

SUMMARY OF THE INVENTION

An object of the present invention is to provide a bit field logic operation unit which can perform a logic operation accompanied by a mask operation, within one machine cycle.

Another object of the present invention is to provide the aforementioned bit field logic operation unit, wherein the unit is constituted from a small number of elements and the power consumption thereof is small.

Still another object of the present invention is to provide a monolithic microprocessor wherein a bit manipulation instruction can be quickly executed, in particular, to provide a monolithic microprocessor wherein a variable-length bit field manipulation instruction, for example, an instruction to perform a specified logic operation on variable-length bit fields of a source data and a destination data and to store the operation result into a bit field of the destination side, can be executed within a smaller number of machine cycles.

In accordance with the present invention there is provided a bit field logic operation unit comprising a logic operation means for performing a specified logic operation on source data and destination data to output a logic operation result, a mask pattern generation means for simultaneously calculating a bit mask pattern from mask information in parallel with the operation of the logic operation means, and a bit map operation means for selecting either the logic operation result or the destination data in each bit position according to the bit mask pattern to output a masked logic operation result.

It is preferable that the logic operation means and the mask pattern generation means are constituted by dynamic circuit constructions where the processes are performed in a precharge period to charge circuit elements according to input signals, and an active period to output processed data.

It is more preferable that the precharge period of the logic operation means and the precharge period of the mask pattern generation means are carried out simultaneously.

In accordance with the present invention there is also provided a monolithic microprocessor comprising an instruction receiving means for receiving an instruction, a control means for generating control signals according to the instruction transferred from the instruction receiving means, an arithmetic logic unit for performing an arithmetic logic operation in response to the control signal, and a bit field logic operation unit connected to the control means and for performing a logic operation on bit fields of parts of a source data and a destination data both of which comprise a plurality of bits, in response to a bit manipulation instruction, wherein the bit field logic operation unit comprise a logic operation means for performing a specified logic operation on source data and destination data to output a logic operation result, a mask pattern generation means for simultaneously generating a bit mask pattern from mask information in parallel with the operation of the logic operation means, and a bit map operation means for selecting either the logic operation result or the destination data in each bit position according to the bit mask pattern to output a masked logic operation result.

DESCRIPTION OF THE PREFERRED EMBODIMENTS

Figure 1:
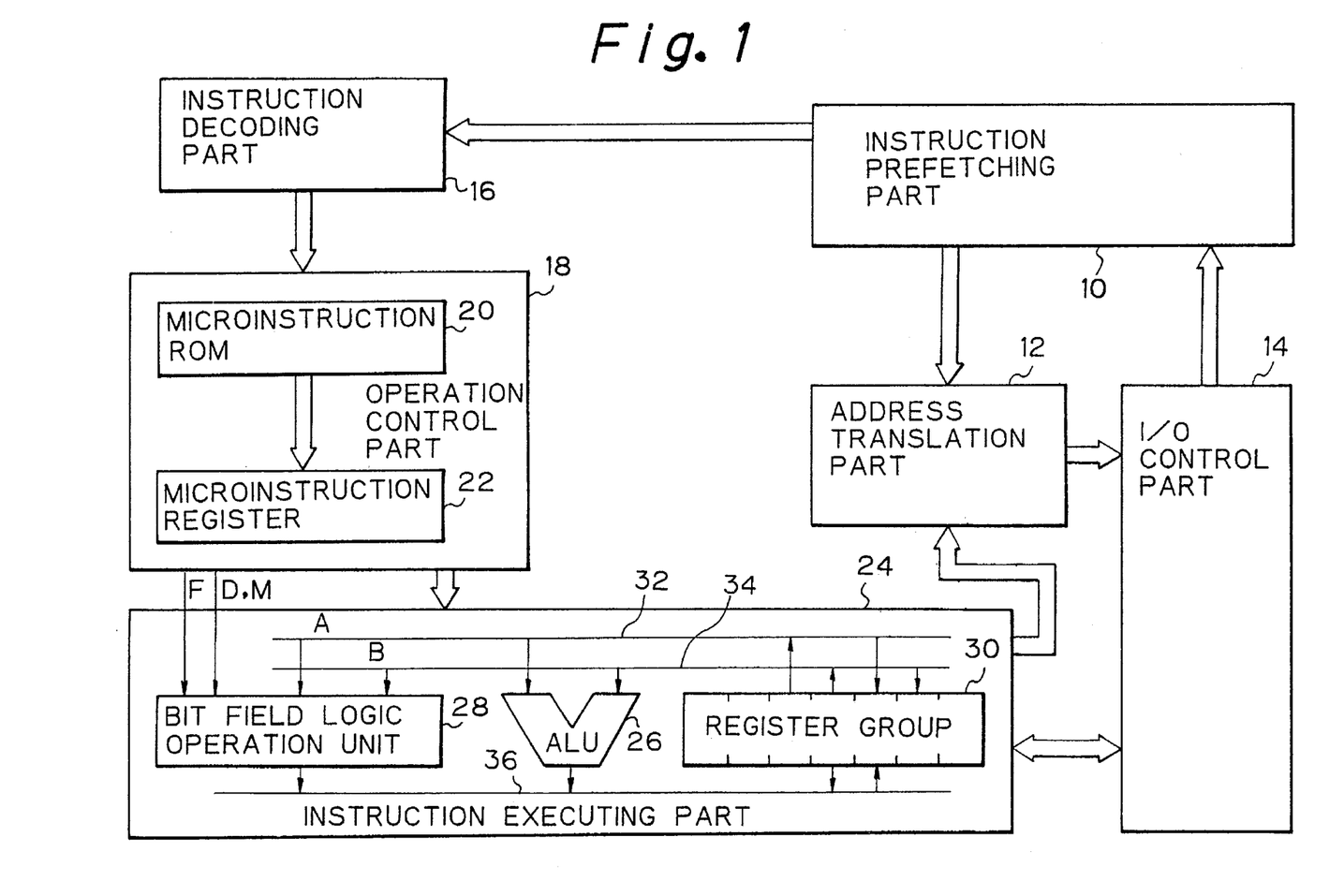
FIG. 1 is a block diagram showing a construction of an example of a microprocessor comprising a bit field logic operation unit according to the present invention.

FIG. 1 shows a construction of an example of monolithic microprocessor, formed in a single semiconductor body comprising a logic operation unit according to the present invention. An instruction prefetching part 10 sends an instruction address to an address translation part 12 and issues an instruction prefetch request to the address translation part 12. The address translation part 12 translates the logical address into a physical address and transfers the translated address to an I/O control part 14. The I/O control part 14 prefetches an instruction and transfers it to the instruction prefetching part 10. The instruction prefetching part 10 transfers the prefetched instruction to an instruction decoding part 16. The instruction decoding part 16 decodes the instruction and transfers decoded information such as an origin address of microinstructions to an operation control part 18.

The operation control part 18 sequentially reads out microinstructions from a microinstruction ROM 20 based on the origin address of microinstructions, stores each microinstruction into a microinstruction register 22, and controls an instruction executing part 24 according to the stored microinstruction and other decoded information to execute the instruction.

The instruction executing part 24 comprises various types of operation units such as an ALU (Arithmetic Logic Unit) 26, a logic operation unit 28, and a register group 30. The operation units and the register groups 30 can exchange data with each other through buses 32, 34, and 36.

A bit manipulation instruction, a variable-length bit field manipulation instruction, or the like is transferred from the instruction decoding part 16 to the operation control part 18. The operation control part 18 supplies the bit field logic operation unit 28 with a control signal, mask data D, and mask data input size M, and the instruction is executed in the bit field logic operation unit 28. As mentioned later, in this embodiment, these bit manipulations can be executed within one machine cycle.

Figure 2:
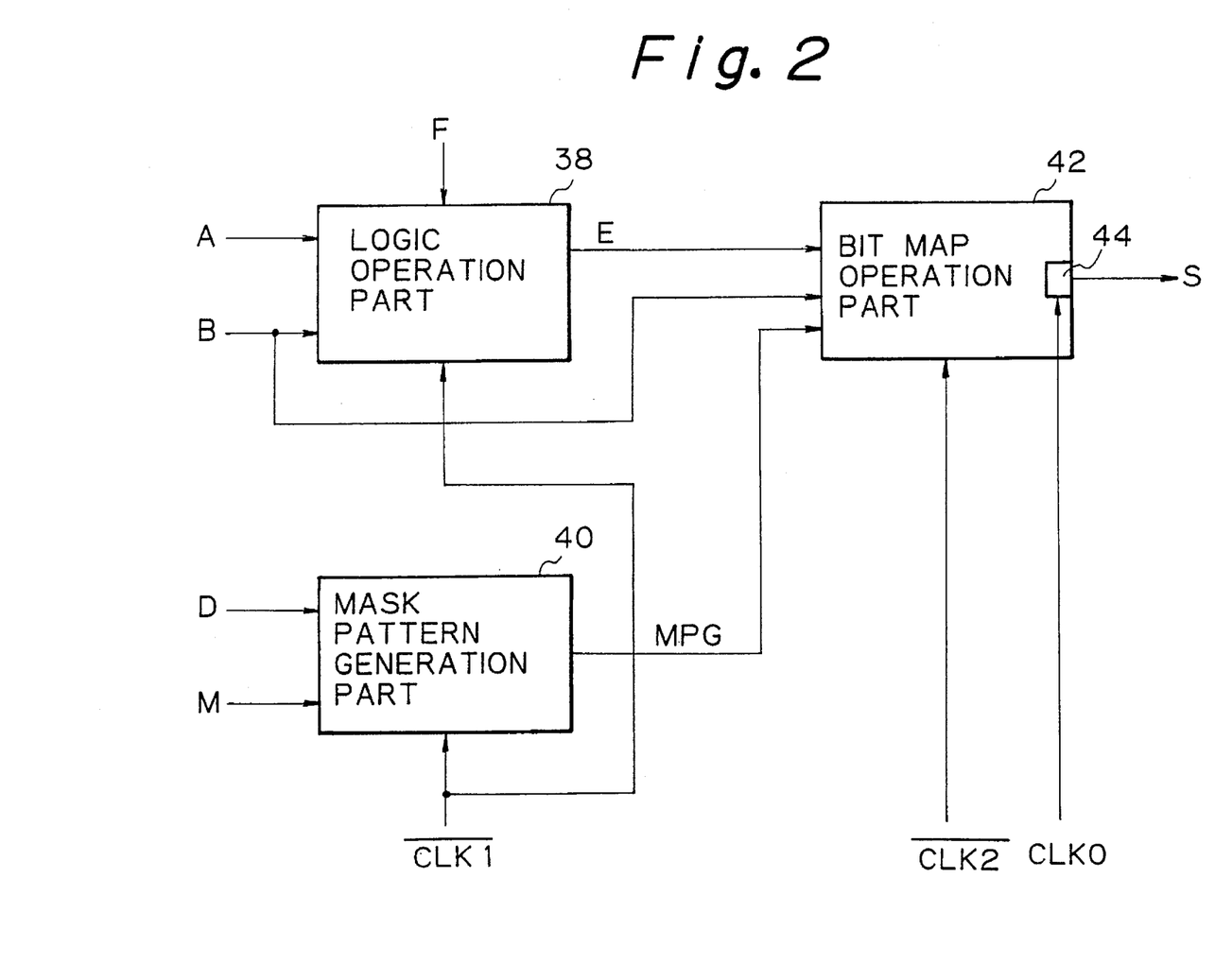
FIG. 2 is a block diagram showing a construction of the bit field logic operation unit shown in FIG. 1.

FIG. 2 shows a construction of the bit field logic operation unit 28 shown in FIG. 1. As shown in FIG. 2, the bit field logic operation unit comprises a bit field logic operation part 38, a mask pattern generation part 40, and a bit map operation part 42. Source data A, destination data B and function signals F are supplied to the logic operation part 38, and a logic operation specified by the function signals is carried out on the source data A and the destination data B. Resulting logic values E from the operation in the logic operation unit 38 are supplied to the bit map operation part 42.

Mask data D and a mask data input size M are supplied to the mask pattern generation part 40, and a mask pattern MPG is generated in the mask pattern generation part 40. The mask data D are, for example, information for specifying a bit position a more or less significant bit or bits of which are masked. The mask data input size M is, for example, information for specifying data type such as a byte or word.

The destination data B, the logic values E and the mask pattern MPG are supplied to the bit map operation part 42. In the bit map operation part 42, each bit of either E or B is selected according to the mask pattern MPG to form output data S.

All of the logic operation part 38, the mask pattern generation part 40 and the bit map operation part 42 are constituted in a dynamic circuit construction where the operation is carried out in a precharge or preset period and an active period under control of a clock signal.

In the preset period, potential of circuit nodes are preset, and then the operation result according to the input signal is output in the active period. Therefore, power consumption in the dynamic circuit is much smaller than in a static circuit, and the number of elements constituting the circuit is relatively small as shown later.

Figure 3A:
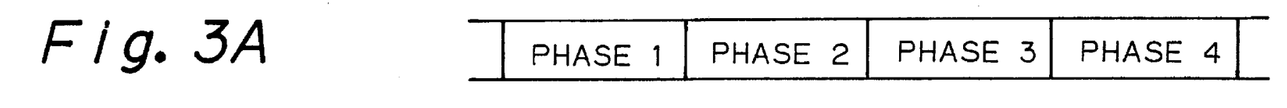
FIGS. 3A to 3H are timing charts showing an operation of the bit field logic operation unit shown in FIG. 2.
Figure 3B:
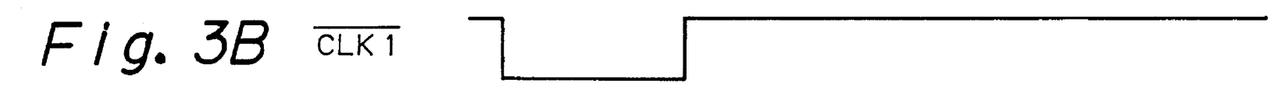
Figure 3C:
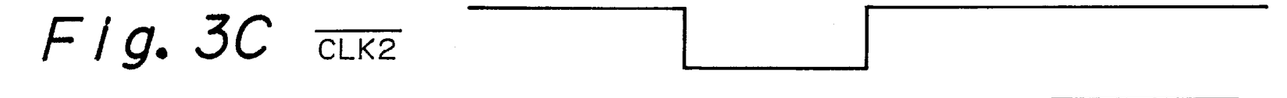
Figure 3D:
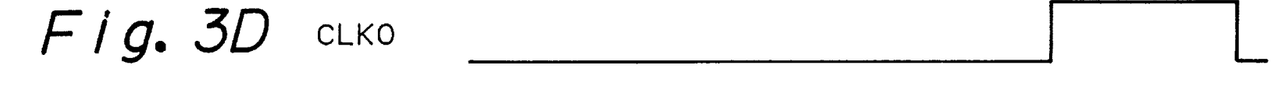
Figure 3E:
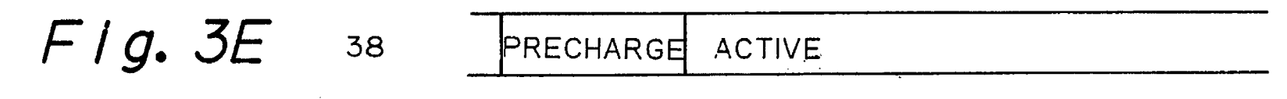
Figure 3F:
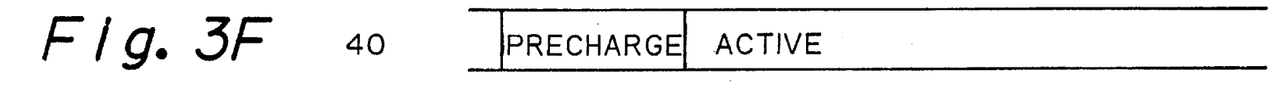
Figure 3G:
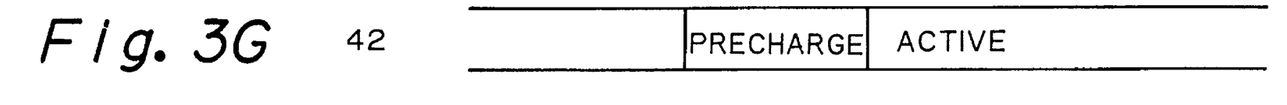
Figure 3H:
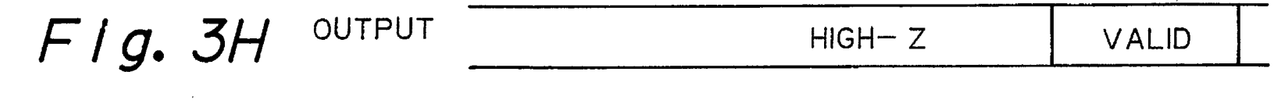

FIGS. 3A to 3H are timing charts showing an operation of the bit field logic operation unit shown in FIG. 2. FIG. 3A represents four phases which constitute a machine cycle. FIGS. 3B to 3D show waveforms of the $\overline{CLK1}$, $\overline{CLK2}$, and CLK0, respectively, shown in FIG. 2. FIG. 3E, FIG. 3F, and FIG. 3G represent operation modes of the logic operation part 38, the mask pattern generation part 40, and the bit map operation part 42. FIG. 3H represents a state of the output signal S.

In phase 1 (FIG. 3A), both the logic operation part 38 and the mask pattern generation part 40 are in the preset period, as the $\overline{CLK1}$ supplied to both parts is at "low" level (FIG. 3B) in phase 1. Potentials of circuit nodes in the logic operation part 38 are preset and potentials of circuit nodes in the mask pattern generation part 40 are preset at the same time.

In phase 2, both the logic operation part 38 and the mask pattern generation part 40 are in the active period, as the $\overline{CLK1}$ is at "high" level. The logic operation part 38 outputs E according to the input A, B and F, and the mask pattern generation part 40 outputs MPG according to the input D and M. On the other hand, the bit map operation part 42 is in the preset period, as the $\overline{CLK2}$ is at "low" level in phase 2. Therefore, potentials of circuit nodes in the bit map operation part 42 are preset.

In phase 3, the bit map operation part 42 is in the active period, as the $\overline{CLK2}$ is at "high" level. Therefore the operation result is fixed within the bit map operation part 42 according to the E, MPG and B.

In phase 4, the output of the latch circuit 44 (FIG. 2) comprised in the bit map operation part 42 is valid as the CLK0 is at "high" level, so that the latch circuit 44 outputs the output signal S.

Figure 4:
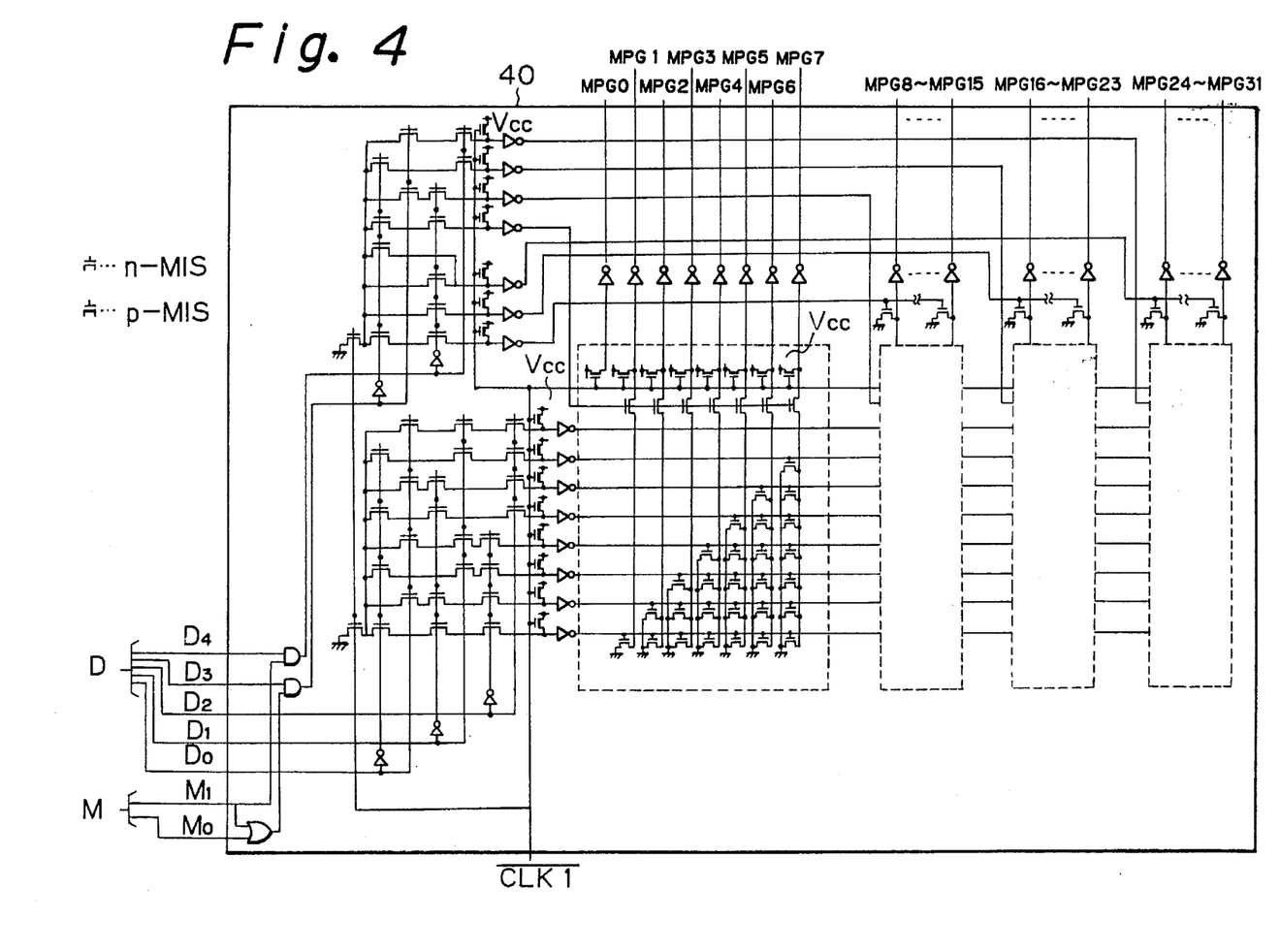
FIG. 4 is a circuit diagram showing the detailed construction of the bit field mask pattern generation part shown in FIG. 2.

FIG. 4 shows a detailed construction of the mask pattern generation part 40.

The mask data input size M represents a data type as shown in Table I.

TABLE I

| $M_1$ | $M_0$ | data type | $MPG_0$–$MPG_7$ | $MPG_8$–$MPG_{15}$ | $MPG_{16}$–$MPG_{23}$ | $MPG_{24}$–$MPG_{31}$ |
|---|---|---|---|---|---|---|
| 0 | 0 | byte | X | 1 | 1 | 1 |
| 0 | 1 | half byte | X | X | 1 | 1 |
| 1 | 0 | word | X | X | X | X |

1: all 1
X: determined by D

For example, when both $M_1$ and $M_2$ are 0 (byte type), the upper 24 bits of MPG ($MPG_8$–$MPG_{31}$) are forced to be "1" and the lower 8 bits of MPG are determined by the mask data D.

The mask data D specifies a bit position which defines the most significant bit of bits having value of "0" as shown in Table II.

TABLE II

| $D_4$ | $D_3$ | $D_2$ | $D_1$ | $D_0$ | $MPG_0$ | $MPG_1$ | $MPG_2$ | ... | $MPG_{31}$ |
|---|---|---|---|---|---|---|---|---|---|
| 0 | 0 | 0 | 0 | 0 | 0 | 1 | 1 | ... | 1 |
| 0 | 0 | 0 | 0 | 1 | 0 | 0 | 1 | ... | 1 |
| 0 | 0 | 0 | 1 | 0 | 0 | 0 | 0 | ... | 1 |
| : | : | : | : | : | : | : | : |  | : |
| 1 | 1 | 1 | 1 | 0 | 0 | 0 | 0 | ... | 0 |

Figure 5:
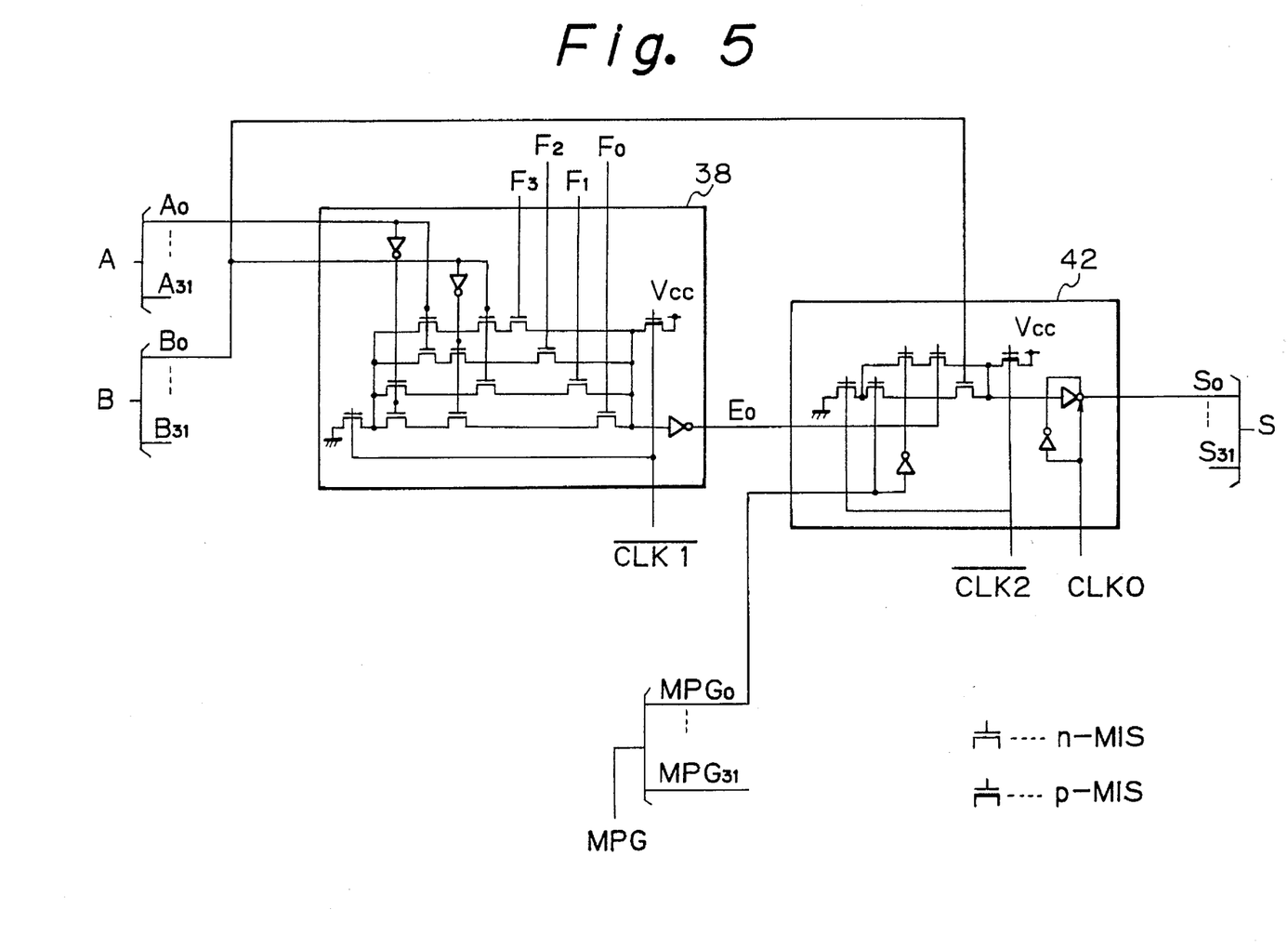
FIG. 5 is a circuit diagram showing the detailed construction of the logic operation part and the bit map operation part shown in FIG. 2.

FIG. 5 shows detailed constructions of the logic operation part 38 and the bit map operation part 42. In this figure, only a portion for the least significant bits ($A_0$, $B_0$, $MPG_0$, and $S_0$) of the data A, B, MPG, and S, are shown. Portions for other bits ($A_{1-31}$, $B_{1-31}$, $MPG_{1-31}$, and $S_{1-31}$) are identical.

The logic operation part 38 performs a logic operation specified by the $F_0$ to $F_3$ on the source data A and the destination data B, and outputs E, as shown in Table III.

TABLE III

| $F_3$ | $F_2$ | $F_1$ | $F_0$ | E |
|---|---|---|---|---|
| 0 | 0 | 0 | 0 | 0 |
| 0 | 0 | 0 | 1 | $\bar{B}$ AND $\bar{A}$ |
| 0 | 0 | 1 | 0 | B AND $\bar{A}$ |
| 0 | 0 | 1 | 1 | $\bar{A}$ |
| 0 | 1 | 0 | 0 | $\bar{B}$ AND A |
| 0 | 1 | 0 | 1 | $\bar{B}$ |
| 0 | 1 | 1 | 0 | B XOR A |
| 0 | 1 | 1 | 1 | $\bar{B}$ OR $\bar{A}$ |
| 1 | 0 | 0 | 0 | B AND A |
| 1 | 0 | 0 | 1 | $\bar{B}$XOR A |
| 1 | 0 | 1 | 0 | B |
| 1 | 0 | 1 | 1 | B OR $\bar{A}$ |
| 1 | 1 | 0 | 0 | A |
| 1 | 1 | 0 | 1 | $\bar{B}$OR A |
| 1 | 1 | 1 | 0 | B OR A |
| 1 | 1 | 1 | 1 | 1 |

The bit map operation part 42 selects $E_i$ (i=0 to 31) or $B_i$ according to logic of the corresponding $MPG_i$. If the $MPG_i$ is "1", $B_i$ is selected and if the $MPG_i$ is "0", $E_i$ is selected.

Figure 6:
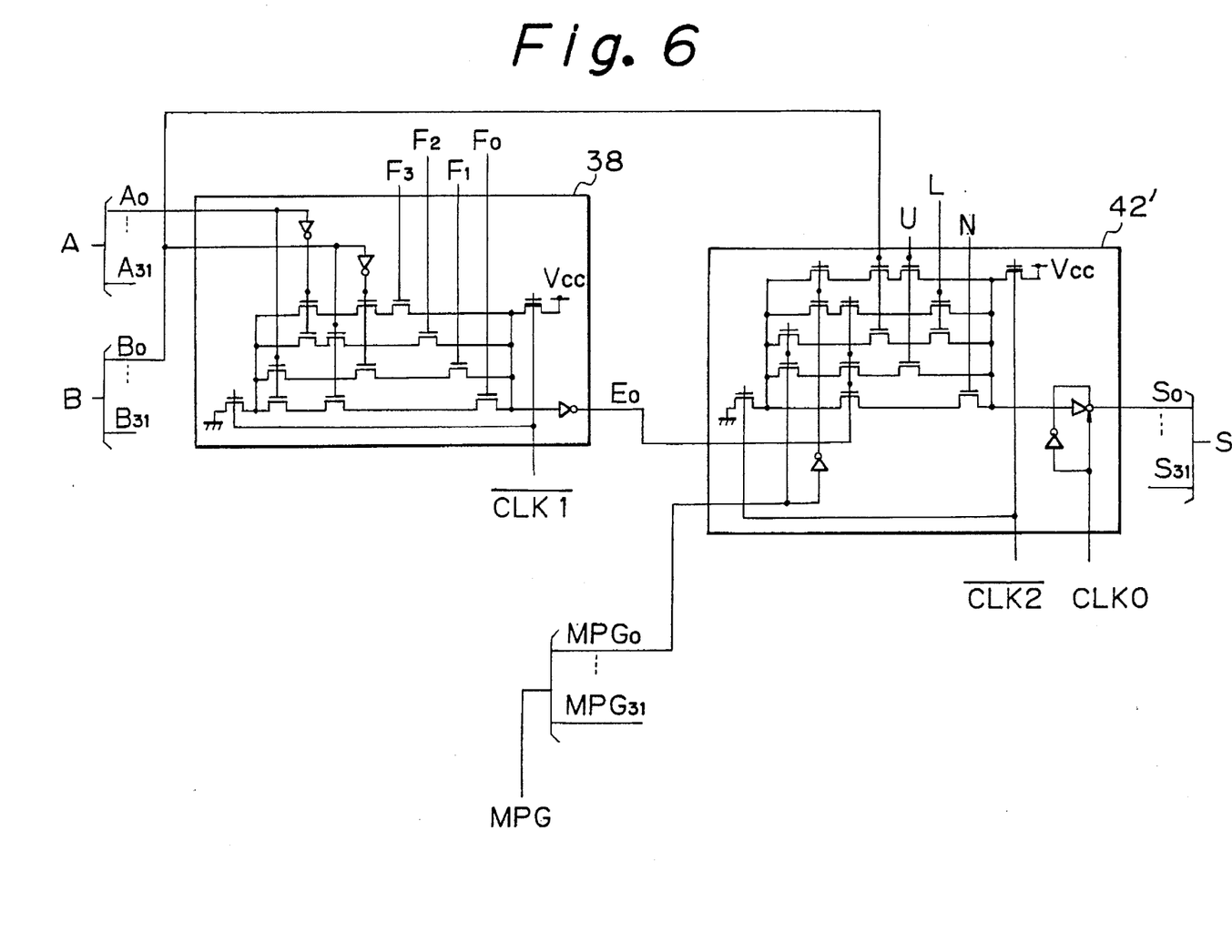
FIG. 6 is a circuit diagram representing another embodiment of the bit map operation part.

FIG. 6 shows another embodiment of the bit map operation part 42.

The signals U, L and N are signals for specifying a masking mode. When the signal U is "1", a bit or bits of output signal S corresponding to a bit or bits of MPG having a logic value "1" become corresponding bit or bits of E, and a bit or bits of output signal S corresponding to a bit or bits of MPG having a logic value "0" become corresponding bit or bits of B, namely, the upper bit or bits are unmasked. When the signal L is "1", a lower bit or bits are unmasked. When the signal N is "1", all bits are unmasked.

We claim:

1. A bit field logic operation unit, comprising:
   a logic operation means for performing a specified logic operation on source data and destination data to output a logic operation result;
   a mask pattern generation means, operably coupled to said logic operation means, for generating, simultaneous and in parallel with an operation of said logic operation means, a bit mask pattern from mask information; and
   a bit map operation means, operably coupled to said logic operation means and said mask pattern generation means, for selecting one of a logic operation result and a destination data in each bit position according to the bit mask pattern to output a masked logic operation result,
   wherein the logic operation means and the mask pattern generation means are comprised of dynamic circuits having circuit nodes,
   wherein said logic operation means and said mask pattern generation means simultaneously operate within a preset period, based on a timing signal inputted to said logic operation means and said mask pattern generation means, for simultaneously presetting potentials of said circuit nodes of said logic operation means and said mask pattern generation means, and
   wherein said logic operation means and said mask pattern generation means operate at an active period for outputting processed data therefrom according to input signals inputted therein.

2. A bit field logic operation unit as claimed in claim 1, wherein the preset period of the logic operation means and the preset period of the mask pattern generation means are carried out simultaneously.

3. A bit field logic operation unit as claimed in claim 2, wherein the bit map operation means is also comprised of a dynamic circuit.

4. A bit field logic operation unit as claimed in claim 3, wherein the active period of the logic operation means and the mask pattern generation means and the preset period of the bit map operation means are carried out simultaneously.

5. A bit field logic operation unit as claimed in claim 4, wherein the bit map operation means receives signals from the mask pattern generation means for specifying a masking mode, and an operation mode of the bit map operation means is altered according to the signals.

6. A monolithic microprocessor, comprising:
   an instruction receiving means for receiving an instruction;
   a control means, operably coupled to said instruction receiving means, for receiving said instruction from said instruction receiving means and for generating control signals according to said instruction;
   an arithmetic logic unit, operably coupled to said control means, for receiving said control signals from said control means and for performing an arithmetic logic operation in response to said control signals; and
   a bit field logic operation unit connected to the control means and for performing a logic operation on bit fields of parts of a source data and a destination data both of which comprise a plurality of bits, in response to a bit manipulation instruction, wherein the bit field logic operation unit comprises:
   a logic operation means for performing a specified logic operation on source data and destination data to output a logic operation result;
   a mask pattern generation means, operably coupled to said logic operation means, for generating, simultaneous and in parallel with an operation of said logic operation means, a bit mask pattern from mask information; and
   a bit map operation means, operably coupled to said logic operation means and said mask pattern generation means, for selecting one of a logic operation result and a destination data in each bit position according to said bit mask pattern to output a masked logic operation result,
   wherein said logic operation means, said mask pattern generation means, and said bit map operation means are comprised of dynamic circuits having circuit nodes, wherein said logic operation means and said mask pattern generation means simultaneously operate within a preset period, based on a timing signal inputted to said logic operation means and said mask pattern generation means, for simultaneously presetting potentials of said circuit nodes of said logic operation means and said mask pattern generation means, and wherein said logic operation means and said mask pattern generation means operate at an active period for outputting processed data therefrom according to input signals inputted therein.

7. A monolithic microprocessor as claimed in claim 6, wherein said preset period and said active period of said logic operation means overlap said preset period and said active period of said mask pattern generation means, respectively, and wherein said active periods of said logic operation means and said mask pattern generation means overlap a preset period of said bit map operation means.

8. A monolithic microprocessor as claimed in claim 6, wherein the mask pattern generation means receives a mask data and a size data and generates the bit mask pattern for a variable length bit field specified by the bit manipulation instructions.

9. A monolithic microprocessor as claimed in claim 6, wherein the arithmetic logic unit performs the arithmetic logic operation without the arithmetic logic unit receiving the bit manipulation instruction.

10. A monolithic microprocessor as claimed in claim 6, further comprising a bus means connected to the bit field logic operation unit and the arithmetic logic unit, wherein the source data, the destination data, and the masked logic operation result are transferred through the bus means.

* * * * *